Dec. 6, 1955
D. G. ROOS
2,725,955
LUBRICATING MEANS FOR VALVE MECHANISM OF
AN INTERNAL COMBUSTION ENGINE
Filed Feb. 15, 1951
3 Sheets-Sheet 3
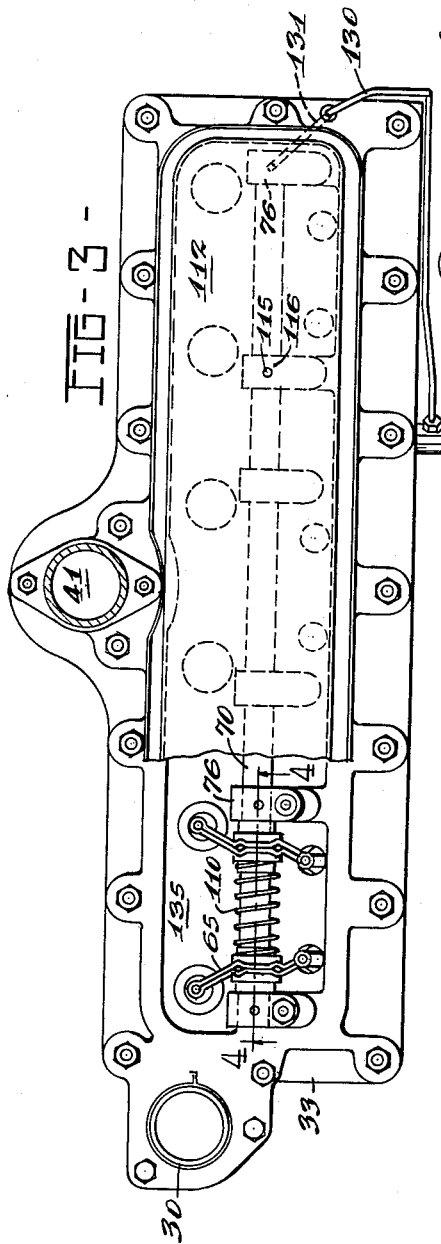
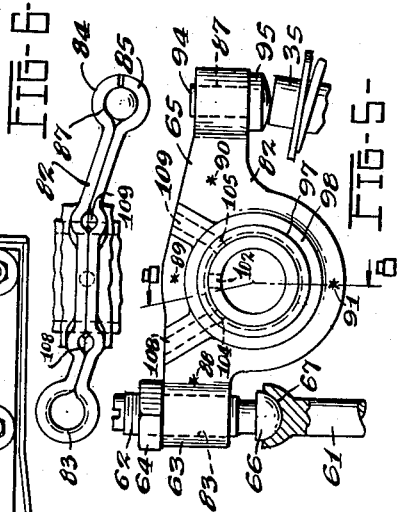
INVENTOR:
DELMAR G. ROOS.
BY
Harry O. Ernsberger
ATTORNEY

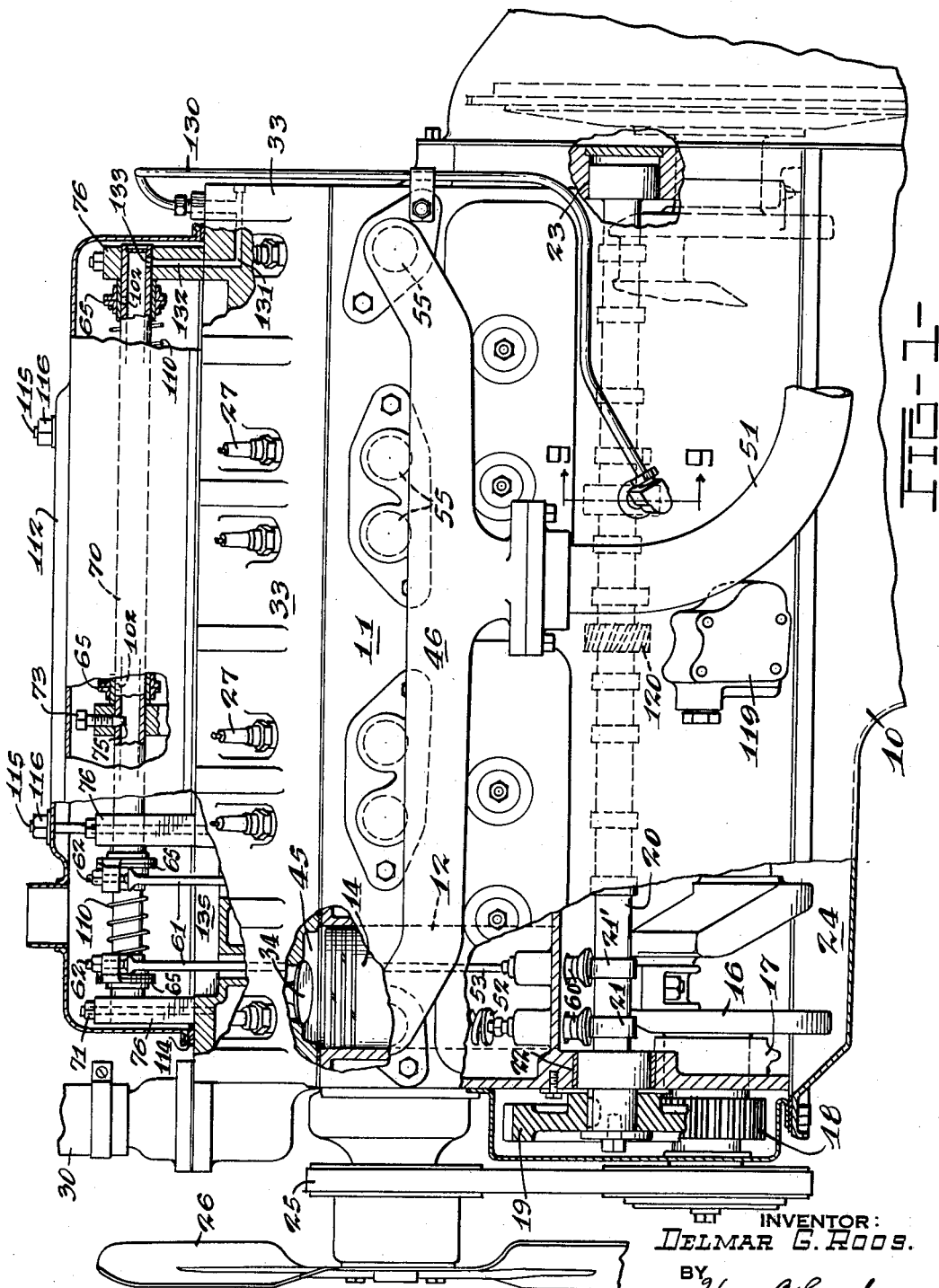

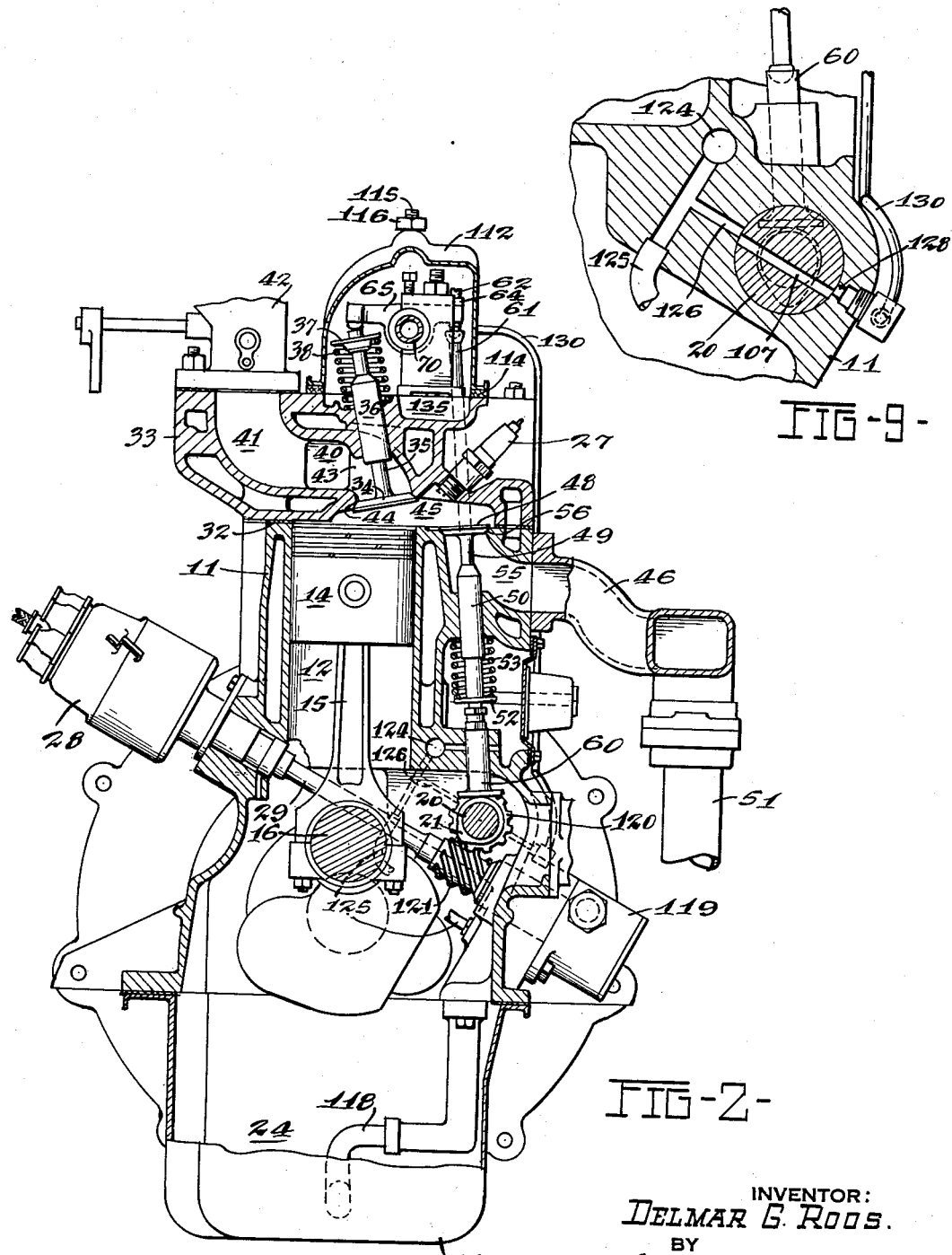

United States Patent Office 2,725,955
Patented Dec. 6, 1955

2,725,955
LUBRICATING MEANS FOR VALVE MECHANISM OF AN INTERNAL COMBUSTION ENGINE

Delmar G. Roos, Toledo, Ohio, assignor, by mesne assignments, to Bank of America National Trust and Savings Association, a national banking association Application February 15, 1951, Serial No. 211,093

6 Claims. (Cl. 184—6)

This invention relates to internal combustion engines and more especially to an improved valve arrangement and lubricating system therefor in combination with improved intake and exhaust manifolding of a character enhancing and improving the operating efficiency of an engine.

It is an object of the present invention to provide an engine embodying an intake valve construction of overhead character which will be simple in structure, economical of manufacture and assembly and highly efficient in use.

Another object of the invention relates to improvements in internal combustion engines with particular reference to improved means for lubricating the valve operating mechanism of the engine.

The invention comprehends the provision of means for supplying lubricant from the engine lubricating system to an overhead valve operating mechanism.

The invention further comprehends the provision of means for definitely limiting or metering the amount of lubricant supplied to the valve operating mechanism and for returning the same to the engine lubricating system so that the valve operating mechanism will not be flooded or over lubricated by an excessive quantity of lubricant nor will the oil pressure be reduced to a dangerous low pressure in the oil lines leading to the crankshaft bearing lubricating system.

Another object of the invention is to regulate the oil supply to the rocker arms of an overhead valve arrangement by providing an improved rocker arm which is adapted to be constructed of sheet metal and including a bushing embodying a serpentine groove for conducting oil in an efficient and effective manner to the bearing surfaces on the rocker arm shaft.

Further objects and advantages are within the scope of this invention such as relate to the arrangement, operation and function of the related elements and to combinations of parts, elements per se, and to economies of manufacture and numerous other features as will be apparent from a consideration of the specification and drawing of a form of the invention, which may be preferred, in which:

Figure 1 is a side elevational view of an internal combustion engine such as a vertical water cooled engine of a character used to furnish power for automobiles and the like, certain portions of the engine being broken away for purposes of illustration;

Figure 2 is a transverse sectional view of the engine illustrated in Figure 1, certain portions of the engine shown in full, the view illustrating in particular the cylinder head and the intake fuel passage integrally formed therein;

Figure 3 is fragmentary plan view of the engine shown in Figures 1 and 2 with certain parts removed, and a portion of the cylinder head cover broken away to illustrate the arrangement of valve operating rocker arms mounted upon the rocker arm shaft;

Figure 4 is a fragmentary longitudinal sectional view taken substantially on the line 4—4 of Figure 3;

Figure 5 is a side elevation of a rocker arm and fragmentary portions of a valve stem, valve spring push rod and associated elements mounted upon a supporting shaft;

Figure 6 is a fragmentary plan view of the rocker arm shown in Figure 5;

Figure 7 is a developed view of the oil groove arrangement incorporated in the rocker arm bushing showing the serpentine type pattern;

Figure 8 is a sectional view taken substantially on line 8—8 of Figure 5, and

Figure 9 is a sectional view on an enlarged scale showing a fragmentary portion of the engine illustrated in Figures 1 and 2 with a portion of the cam shaft and associated parts shown in section illustrating the lubricant feeding and metering arrangement for the overhead valve operating mechanism.

While the invention has been illustrated as adaptable for association with a particular type of internal combustion engine, it is to be understood that the invention may be embodied in other types of engine construction wherever it may be found to have utility.

Referring to the drawings in detail and first with respect to Figures 1 and 2, there is illustrated a water cooled internal combustion engine of the multicylinder type having a crankcase 10 to which is secured an engine block 11 comprising cylinders 12, pistons 14 reciprocable therein, piston connecting rods 15, crankshaft 16, crankshaft bearing 17, crankshaft timing gear 18, camshaft timing gear 19, camshaft 20, cams 21 for operating the exhaust valves, cams 21' for operating the overhead intake valves, front camshaft bearing 22, rear camshaft bearing 23, oil sump or reservoir 24, fan belt 25, cooling fan 26, spark plugs 27, distributor 28, distributor shaft 29, and water inlet 30 connected to a suitable cooling radiator (not shown).

The aforesaid elements or components may be of conventional or standard type and need not therefore be described in greater detail.

Referring more especially to Figure 2, it will be apparent that the engine block 11 is shown with one of the pistons 14 within a cylinder bore 12 and with piston connecting rod 15 assembled on one of the crank arms of the crankshaft 16. The engine block 11 is provided with a cylinder head 33 secured to its upper surface with a gasket 32 interposed therebetween. The cylinder head 33 as shown embodies upwardly seating intake valves 34, one of which is illustrated in Figure 2 having its valve stem 35 slidably mounted in the guide bushing 36, the upper portion of said valve stem carrying a cap 37 against which the upper end of the valve spring 38 contacts, the lower end of the spring resting upon the cylinder head.

The cylinder head embodies a fuel mixture chamber or passage 40 which extends longitudinally and substantially the entire length thereof. A single downwardly extending elbow-shaped fuel mixture entrance passage 41 is embodied in said cylinder head 33, substantially equidistant from its ends, and extends from the passage 40 to the upper surface of the head. Secured to the cylinder head in registration with the passage 41 is a carburetor 42 which may be of any standard type suitable for down draft carburetion. Arranged between said longitudinally extending fuel mixture distribution passage 40 and each cylinder 12 is a passage 43, the engine illustrated having six cylinders requiring six passages or branches 43. By this arrangement there is provided a continuous downward passage for the fuel mixture from carburetor 42 down through passage 41, horizontally through chamber 40 into the branches or passages 43 to the six chambers 45 suitably formed above each cylinder providing the combustion chambers. The outlet of each passage 43 is shaped to form a valve seat 44 against which each intake valve 34 rests when in closed position. The engine block 11 embodies a plurality of downwardly seating exhaust valves 48, each having a valve stem 49 slidably mounted in a guide bushing 50, the lower portion of each valve stem 49 carrying a cap 52 against which the lower end of valve spring 53 contacts, the upper end of said spring 53 contacting the engine block 11. The engine block has a plurality of elbow-shaped and generally downwardly extending passages 55, one of the passages being connected with each chamber 45 and extending to the exterior of the engine block 11, forming six exhaust ports for the attachment of a conventional exhaust manifold 46 to which is connected a single downwardly extending exhaust pipe 51. The perimeter of each outlet in the upper surface of passages 55 forms valve seats 56 against which exhaust valves 48 rest when in closed position.

The carburetor on conventional type engines is usually attached to a separable or removable intake manifold of an engine. In conventional carburetion methods, the movements of the pistons set up differential or reduced pressure in the manifold effective upon the carburetor to establish a fuel and air mixture supplied to the cylinders through a manifold. The carburetor is designed to give a perfect mixture and to provide an efficiently operating engine; this mixture must remain in a homogeneous condition and be delivered to the cylinders in this condition. Heretofore intake manifolds have been used so that a portion thereof will contact the exhaust manifold forming a hot spot whereby heat therefrom is transformed to the fuel mixture within the intake manifold for the purpose of volatilizing liquid particles remaining in the mixture. The fuel mixture in such manifolds usually travels downwardly to the hot spot position and then travels horizontally and generally upwardly to reach the intake ports in the side of the engine block, or cylinder head, as the case may be. This is particularly true of an L-head type of engine. In such a manifold arrangement, the exteriorly disposed intake manifold extending to the forward end of the engine usually becomes cooled due to the air from the cooling fan, a condition affecting the mixture within the manifold as it tends to reduce the fuel vapor to liquid particles or globules. The exterior portion of such intake manifold extending toward the rear of the engine becomes very warm because of the heated air accumulated at the rear of the engine. This added heat effective at the rear of the manifold increases the temperature of the fuel mixture at that zone of the intake manifold. The fuel-air mixture received by the forward combustion chambers tends toward a weak mixture, the condensed vapor or liquid fuel in the chilled mixture passing unburned through the engine resulting in a loss of power. The fuel mixture received by the combustion chambers in the rear cylinders being warmer than desired affects the volumetric efficiency and tends to result in a loss of power.

In order that a mixture of combustible gas or vapor with air shall be explosive and give maximum power, the ratio of air to gas must lie within certain limits. The carburetor provides the mixture that has just sufficient oxygen for complete combustion of the fuel, but the efficiency of most engines is reduced due, in part, to the manifold construction. In the arrangement of the present invention, the carburetor is mounted directly on the cylinder head in registration with the mixture passageway within the cylinder head. The mixture being formed in the head is surrounded by walls heated substantially uniformly due to substantially constant water-jacket temperature of a water cooled engine. In the present manifold arrangement the fuel mixture passes downwardly at all times from the carburetor into the combustion chambers, the temperature and quality of the fuel mixture delivered to the forward cylinders being the same as that delivered to the rear cylinders. A homogeneous mixture free of liquid fuel at a proper temperature facilitates an increase in compression pressure with an increase in efficiency, these advantages being attained through the use of the improved mixture passage or manifold arrangement.

In order to maintain high engine efficiency, friction of moving parts should be kept at a minimum through efficient lubrication. The present invention includes an improved means for lubricating the rocker arms of the valve mechanism. Methods of lubricating overhead rocker arms in the past have been very unsatisfactory.

In the engine of this invention each cylinder in the engine is provided with one intake port and one exhaust port. The intake ports are opened and closed by overhead valves 34 while the exhaust ports are opened and closed by valves 48. The exhaust valves are operated by a plurality of cams 21 on camshaft 20 in conventional manner. The intake valves are closed and opened in timed relation to the operation of the engine by overhead springs and rocker arm mechanism. Suitable coiled compression springs 38 urge the intake valves toward their closed position. The intake valves are opened through the intermediation of the cams 21' on camshaft 20, suitable valve lifters 60, push rods 61, threaded ball end adjusting screws 62 which are in threaded engagement with the ends 63 of rocker arms 65 which receive lock nuts 64. The lower end of each threaded adjusting screw 62 terminates in a ball portion 66 which is seated in a socket 67 formed in the upper end of a push rod 61.

The six rocker arms 65 are journaled in spaced relation upon a rocker arm shaft 70 supported by a plurality of pedestals 76 secured by cap screws 71 extending into threaded openings in the cylinder head casting 33. Certain of the pedestals 76 are provided with set screws 73 for securely fastening the rocker arm shaft 70 in position, the screws 73 having tapered portions 75 extending through openings 78 in shaft 70. The shaft 70 is of hollow or tubular construction forming a lubricant passage or chamber, the ends being closed by cup shaped closures 80 pressed into each of its open ends in a manner forming a liquid tight seal.

Each of the rocker arms 65 is inclusive of a metal stamping 82 which is folded intermediate its ends forming a laminated construction and a cylindrical portion 63 defining an opening 83. At the opposite end of the arm the laminations are shaped to provide generally semi-cylindrical portions 84 and 85, these portions conjointly forming a second opening 87. The laminations are preferably welded together at points 88, 89, 90 and 91 affording a rigid structure of comparatively light weight. A pin 94 having a head 95 is provided for the rocker arm, the shank of the pin being pressed into the opening 87. The opening 83 at the other end of the arm is threaded and receives the screw 62 which is adjustably locked in position by the lock nut 64 at the upper side of the arm. Each of the arms is to be oscillated by a moving part engaging one end of the arm to raise it while the other end of the arm engages an intake valve to open the adjacent inlet port.

The rocker arm construction intermediate its ends has a hub receiving opening 97 the annular walls of which are broadened axially of the opening by outturning the edge wall bounding the opening of each metal layer to form annular axially projecting flanges 98. A tubular bushing 99 shown at Figure 4 is preferably formed of a strip of metal rolled to annular configuration and is of an external diameter to snugly fit the opening 97. If desired it may be more securely anchored in position by applying pressure to both ends thereof while the inner surface of the bushing 99 is confined. The bushing 99 is shown in Figure 7 in developed or flat form before shaping to annular configuration and shows the contour of an oil groove 100 embodied in its bearing surface. Two openings 104 and 105 are provided in the bushing 99 which are out of communication with the serpentine shaped oil groove 100.

The rocker arm shaft 70 is formed with openings 102, one opening being disposed adjacent each bushing. During oscillation of the rocker arms, the groove 100 in each arm periodically registers with one of the openings 102 in the rocker arm shaft 70 for the purpose of supplying oil to the serpentine oil grooves 100, oil being supplied under pressure to said shaft 70 when the engine is operated. As shown in Figure 7, the oil seeps across the bearing surface from the groove 100. The oil which passes out through openings 104 and 105 flows through two channels or vents 108 and 109 formed between the arm laminations as clearly shown in Figures 5 and 6.

As shown in Figures 3 and 4, a spring 110 is positioned between adjacent rocker arms 65, said spring pressing against the terminal end portions of hub members 98. Each pair of rocker arms 65 is spaced from pedestals 76 by bushings 99 having their distant terminal end portions in contact with adjacent pedestals. The rocker arm shaft 70 and associated mechanisms are covered or enclosed by a metal housing 112 generally designated an overhead valve chamber cover; said housing being spaced from the cylinder head 33 by a gasket 114 and removably secured to said head 33 by locking bolts 115 and nuts 116.

A supply of lubricating oil is carried in the sump or reservoir 24 of crankcase 10, the oil being forced under pressure through the bearings and to other working parts of the engine. The oil is circulated from the sump 24 through a suitable conduit 118 and a pump (not illustrated) assembled on the lower end of shaft 29 and enclosed within a casing 119 shown in Figures 1 and 2. The pump is driven by a gear 120 on the camshaft meshing with a gear 121 mounted upon the distributor shaft 29 thereby establishing a drive for both the rotor in the distributor 28 and the oil pump. The lubricant or oil is pumped through line 125 under pressure to the main oil line or duct 124 extending lengthwise of the engine block from which the oil is distributed to the crankshaft bearings and other moving parts.

In order to pump oil to the rocker arm shaft 70, oil is obtained from the pressure line 125 through a duct 126 made in engine block in communication with a duct 127 bored transversely through the camshaft 20 in an off-center relation to the inlet duct 126 and an outlet duct 128 as shown in Figure 9. The offset duct or passage 127 through the camshaft only establishes through communication with the main oil line 125 for a very short portion of a revolution of the camshaft whereby the flow of oil to the rocker arm arrangement is metered or restricted. The oil flows from duct 128 through an oil line or tube 130 to an oil duct 131 formed in the uppermost section of the cylinder head 33, said duct 131 communicating with a duct 132 formed in the rocker arm shaft pedestal 76 positioned at the rear end of the engine and supporting an end of the hollow shaft 70. The duct 132 registers with an opening 133 in the shaft 70 whereby oil from line 130 will travel under pressure lengthwise through the interior of the rocker arm shaft 70 and is distributed to the rocker arm bearings through openings 104 and 105, and is exuded through vents 108 and 109. The oil, after it is exuded from the rocker arm vents 108 and 109, spills or falls into trough 135 formed in upper surface of the cylinder head casting 33 from whence it flows back to the oil sump 24 of the crankcase 10 along the exterior surfaces of the push rods 61, this oil also serving to lubricate the push rod guides and tappets disposed at the lower ends of said push rods 61.

The above described arrangement for lubricating the overhead rocker arm assembly enclosed within housing 112 involves the novel metering arrangement of a duct through the camshaft arranged for periodic registration with the oil pressure line and the feed passages for the rocker arms whereby the oil fed under pressure to said rocker arm assembly does not appreciably reduce the pressure to the crankshaft lubrication system where a substantial oil pressure must be maintained at all times.

The arrangement of intake and exhaust manifolds being disposed in opposing side zones of the engine and configurated in a manner whereby the fuel and air mixture at all times flows downwardly into the combustion chambers and wherein the exhaust gases are conveyed away in a downward path provides an efficiently operating engine. The intake arrangement provides for delivery of a substantially uniform mixture to the several cylinders whereby maximum power is derived from the engine.

It is apparent that, within the scope of the invention, modifications and different arrangements may be made other than is herein disclosed, and the present disclosure is illustrative merely, the invention comprehending all variations thereof.

What I claim is:

1. In combination with an internal combustion engine having an overhead valve; a hollow rocker arm shaft supported adjacent the overhead valve and in communication with a source of oil supply under pressure, a closure for each end of said shaft to form an oil chamber therein; a rocker arm having a bearing journaled on said shaft; a constantly open port leading from said rocker arm shaft to the bearing in said rocker arm, a camshaft, a rectilinear duct arranged transversely through said camshaft having its axis offset from the axis of the camshaft to meter the supply of oil from said source of supply to said rocker arm shaft, aligned oil ducts in said rocker arm and said rocker arm bearing for conveying oil from the bearing of said arm, and a groove formed in said bearing arranged for registration with the constantly open port in the rocker arm shaft for distributing oil over the bearing surface, said groove being out of registration with the oil ducts formed in the rocker arm bearing.

2. The combination of a valve actuating laminated rocker arm for an internal combustion engine mounted on a tubular shaft, said rocker arm having a flanged hub portion, a bearing rigidly mounted in the hub portion thereof; said arm having a plurality of oil ducts leading from the internal surface of said hub to the top surface of said rocker arm, said ducts being arranged between the laminations of said arm; said bearing being formed with an oil groove of serpentine form; said bearing having a plurality of oil ducts extending transversely therethrough and positioned in alignment to register with said oil ducts in said arm, the oil groove in said bearing extending between and out of registry with the bearing oil ducts, said tubular shaft having an oil duct adapted to register with said serpentine groove, a source of oil supply under pressure, means to meter said source of oil supply to a pipe line for conveying oil to the interior of said tubular rocker arm shaft, said oil ducts in said arm conveying oil from the bearing to the top of said rocker arm.

3. A lubricating means for rocker arm bearings of an internal combustion engine including a plurality of rocker arms, bearings mounted in said rocker arms, a tubular shaft supporting said arms and said bearings, a pipe line leading to said shaft, a source of lubricant under pressure, a camshaft, a duct conveying lubricant to an exterior surface of the camshaft, and a rectilinear passage arranged transversely through said camshaft and arranged for intermittent partial registry with the duct and pipe line for metering the flow of lubricant from said source into said pipe line, the cross-sectional area of registry of the passage with the duct and pipe line being substantially less than the cross-sectional area of the passage.

4. A lubricating system for rocker arm bearings of an internal combustion engine including a cylinder block and a plurality of rocker arms, bearings mounted in said rocker arms, a tubular shaft supporting said arms and said bearings, a pipe line leading to said shaft, a source of lubricant under pressure, a camshaft, a main oil line in the engine cylinder block supplying oil under constant pressure to the main bearings in the engine, a duct leading from said main oil line to a camshaft bearing surrounding a portion of said camshaft, a rectilinear duct arranged transversely through said camshaft in an off-center relation to said ducts leading to and from said camshaft bearing, said duct within said camshaft being successively opened and closed by rotation of said camshaft to control the flow of pressure lubricant from said source into said pipe line, the cross-sectional area of opening established between the rectilinear duct in the camshaft and the ducts leading to and from the camshaft bearing being substantially less than the cross-sectional area of said rectilinear duct.

5. A lubricating system for rocker arm bearings of an internal combustion engine including a cylinder block and a plurality of rocker arms, bearings mounted in said rocker arms, a tubular shaft supporting said arms and said bearings, a pipe line leading to said shaft, a source of lubricant under pressure, a camshaft, a main oil line in the engine cylinder block supplying oil under pressure to the main bearings in the engine, a duct leading from said main oil line to a camshaft bearing surrounding a portion of said camshaft, a duct leading from said camshaft bearing to said pipe line, a rectilinear duct drilled transversely through said camshaft in an off-center relation to the axis of the camshaft and said ducts leading to and from said camshaft bearing, said duct within said camshaft being opened and closed by the motion of said camshaft to meter the flow of lubricant from said source into said pipe and to said rocker arm bearings under a variable pressure, the cross-sectional area of opening established between the rectilinear duct in the camshaft and the ducts leading to and from the camshaft bearing being substantially less than the cross-sectional area of said rectilinear duct.

6. A lubricating system for rocker arm bearings of an internal combustion engine including a plurality of rocker arms, bearings mounted in said rocker arms, a tubular shaft supporting said arms and said bearings, a pipe line leading to said shaft, a source of lubricant under pressure, an oil outlet duct leading from said source of lubricant, an oil inlet duct connected with said pipe, a camshaft, a rectilinear duct arranged transversely through said camshaft in an off-center relation to said outlet duct and said inlet duct for partial registration therewith to control the flow of lubricant from the lubricant source into said pipe line, the cross-sectional area of registration between the rectilinear duct and the inlet and outlet ducts being substantially less than the cross-sectional areas of said rectilinear duct and said inlet and outlet ducts.

References Cited in the file of this patent

UNITED STATES PATENTS

| | | |
|---|---|---|
| 1,823,714 | Vincent | Sept. 15, 1931 |
| 2,018,612 | Good et al. | Oct. 22, 1935 |
| 2,080,293 | Whatmough | May 11, 1937 |
| 2,208,750 | De Long | July 23, 1940 |
| 2,288,831 | O'Harrow | July 7, 1942 |
| 2,349,203 | Spencer | May 16, 1944 |
| 2,563,699 | Winter | Aug. 7, 1951 |

OTHER REFERENCES

Product Engineering of January 1949, pages 88, 89 and 90.